United States Patent [19]
Wohlberg et al.

[11] Patent Number: 5,406,189
[45] Date of Patent: Apr. 11, 1995

[54] LOW INPUT HARMONIC INDUCED MULTIPLE USE AC SYNCHRONOUS GENERATOR STARTER CONVERTER

[75] Inventors: Al Wohlberg, Neptune; Robert C. Eckenfelder, Point Pleasant; Muthu K. Murugan, Howell, all of N.J.

[73] Assignee: AlliedSignal Inc., Morristownship, Morris County, N.J.

[21] Appl. No.: 987,524

[22] Filed: Dec. 8, 1992

[51] Int. Cl.[6] .............................................. F02N 11/04
[52] U.S. Cl. .......................................... 322/10; 363/21
[58] Field of Search ...................... 322/10, 59; 290/38, 290/38 R, 46

[56] References Cited

U.S. PATENT DOCUMENTS

| | | | |
|---|---|---|---|
| 4,187,536 | 2/1980 | Govaert et al. | 363/21 |
| 4,481,459 | 11/1984 | Mehl et al. | 322/10 |
| 4,695,936 | 9/1987 | Whittle | 363/21 |
| 4,947,100 | 8/1990 | Dhyanchand et al. | 322/10 |
| 4,968,926 | 11/1990 | Dhyanchand | 322/10 |
| 5,015,941 | 5/1991 | Dhyanchand | 322/10 |
| 5,065,086 | 11/1991 | Takakado | 322/10 |
| 5,239,454 | 8/1993 | Dhyanchand | 363/43 |

*Primary Examiner*—Kristine L. Peckman
*Attorney, Agent, or Firm*—Donald B. Paschburg; Howard G. Massung

[57] ABSTRACT

A synchronous generator start converter offers power conversion for performing multiple functions such as starting AC generators as a motor, charging batteries and also providing regulated DC output without degradation of input power quality. The converter utilizes common magnetic components and common semiconductor rectifiers within its three subcircuits. The three subcircuits include flyback converters, a square wave inverter and a field excitation controller.

18 Claims, 4 Drawing Sheets

LOW INPUT HARMONIC INDUCED MULTIPLE USE AC SYNCHRONOUS GENERATOR STARTER CONVERTER

BACKGROUND OF THE INVENTION

1. Field of the Invention

The present invention relates to power converters, and more particularly to converters that maintain high input power quality and perform multi-functions such as, starting AC generators as a motor to start the main or auxiliary engines, charging batteries, and providing regulated DC outputs.

2. Description of the Prior Art

There are a variety of power converter designs that offer starting functions, battery charging or regulated outputs. These conventional power converters have been found to pollute the input source and degrade input power quality. A typical aircraft is required to utilize three separate converters, one for starting the AC generator as a motor, one for battery charging, and another converter to provide a regulated DC output. The use of three converters increases weight and decreases reliability. It is an object of the present invention to combine all three functions while providing improved input power quality, therefore, taking advantage of the common components of the individual converters.

SUMMARY OF THE INVENTION

The present invention provides a converter capable of starting an AC synchronous generator as a synchronous motor from a three phase AC input or from a DC input, without degradation of input power quality. This converter is also capable of converting a three phase input to a regulated DC output without degrading AC input power quality. Within the disclosed converter, the magnetic components as well as several of the semiconductor rectifiers perform multi-functions. This multi-functionality serves to minimize the total component count allowing the converter to be both compact and lightweight; two critical attributes for aerospace applications.

DETAILED DESCRIPTION OF THE INVENTION

Figure 1:
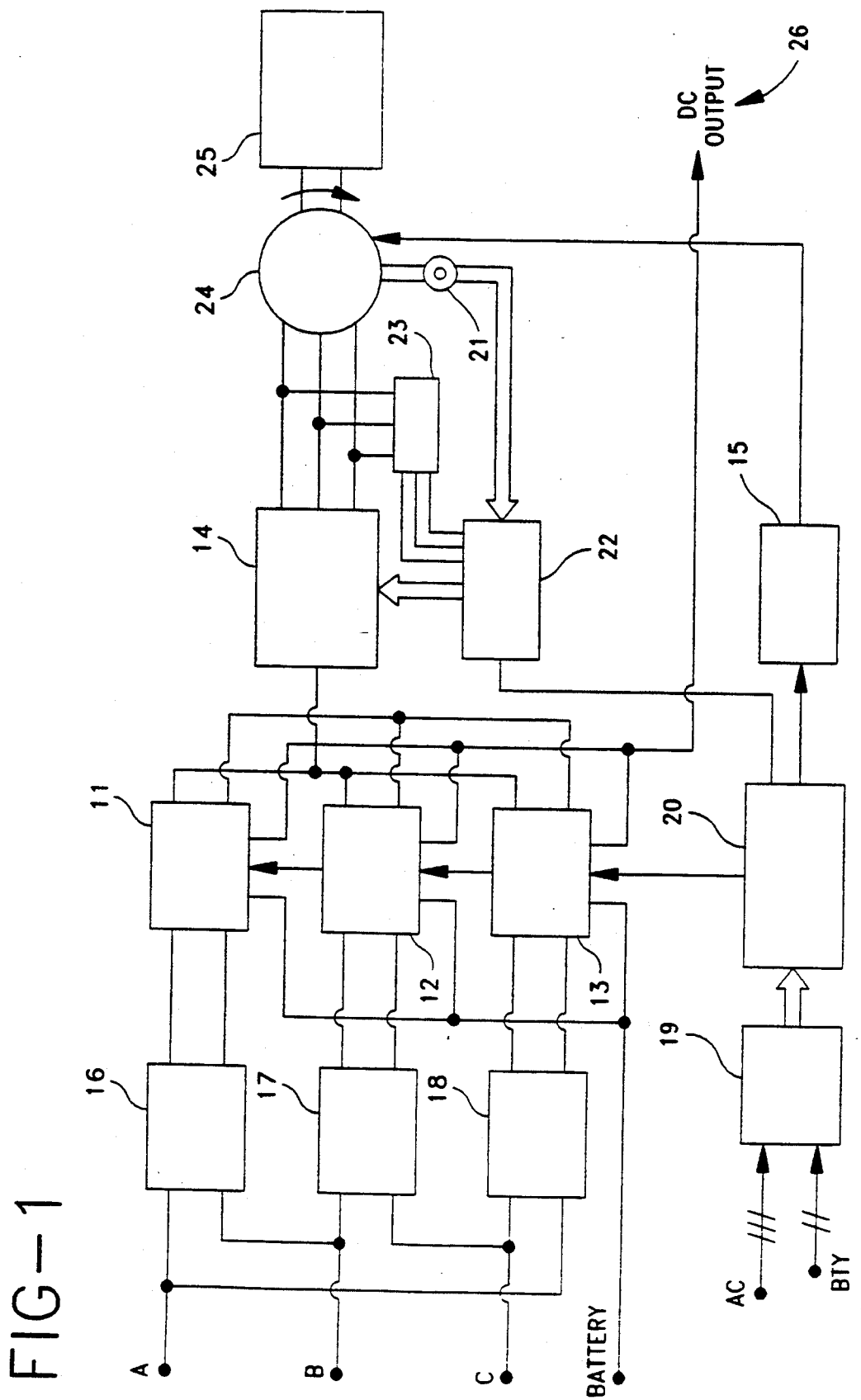
FIG. 1 is a block diagram of a preferred embodiment of the present invention.

As shown in FIG. 1, the present invention consists of three major power subcircuits. They are flyback converters 11, 12 and 13, six step square wave inverter 14 and field excitation controller 15.

The AC input power enters the flyback converters 11, 12 and 13 through single phase bridge rectifiers 16, 17 and 18 and the DC input power enters from the battery. The flyback converters 11, 12 and 13 are controlled by the PWM controller 20. The outputs of the flyback converters 11, 12 and 13 are fed to the six step square wave inverter 14 during AC input start or DC input start of the generator. The six step square wave inverter is controlled by the timing logic 22. The inverter drive signals from the timing logic are locked to the polar position information obtained either directly from the resolver 21 or indirectly from back EMF sensor circuit 23. This feature ensures that the generator never pulls out of synchronism.

The control power supply 19 receives three phase AC input power and battery power and provides control power to the PWM controller 20 timing logic 22 and field excitation controller 15. The field excitation controller 15 converts the 28 VDC power from control power supply 19 to 400 VAC square wave voltage and provide single phase excitation to the exciter stator of the starter/generator 24 connected to the engine 25.

The flyback converters 11, 12 and 13 are chosen such that they operate in discontinuous current conduction mode under all operating conditions. By maintaining a constant duty cycle, the current follows the input voltage, making the impedance of the entire circuit appear purely resistive. The flyback topology at the input provide high input power quality such as high input power factor, low input current harmonic distortion. The flyback converters also provide input/output isolation so that there is no need to disconnect the generator neural or the battery negative from the common ground.

During battery charging, six step square wave inverter 14 is disabled, and the flyback converters 11, 12 and 13 operate from the three-phase AC input. The output of the flyback converters 11, 12 and 13 are summed through active devices such as transistors (not shown) to provide battery charging capability or to provide a regulated DC output 26. The PWM controller 20 operates at a constant 50% duty cycle during start of the AC starter/generator 24. The PWM controller 20 varies the duty cycle of the flyback converters 11, 12 and 13 to control battery charging or the regulated DC output 26.

Figure 2:
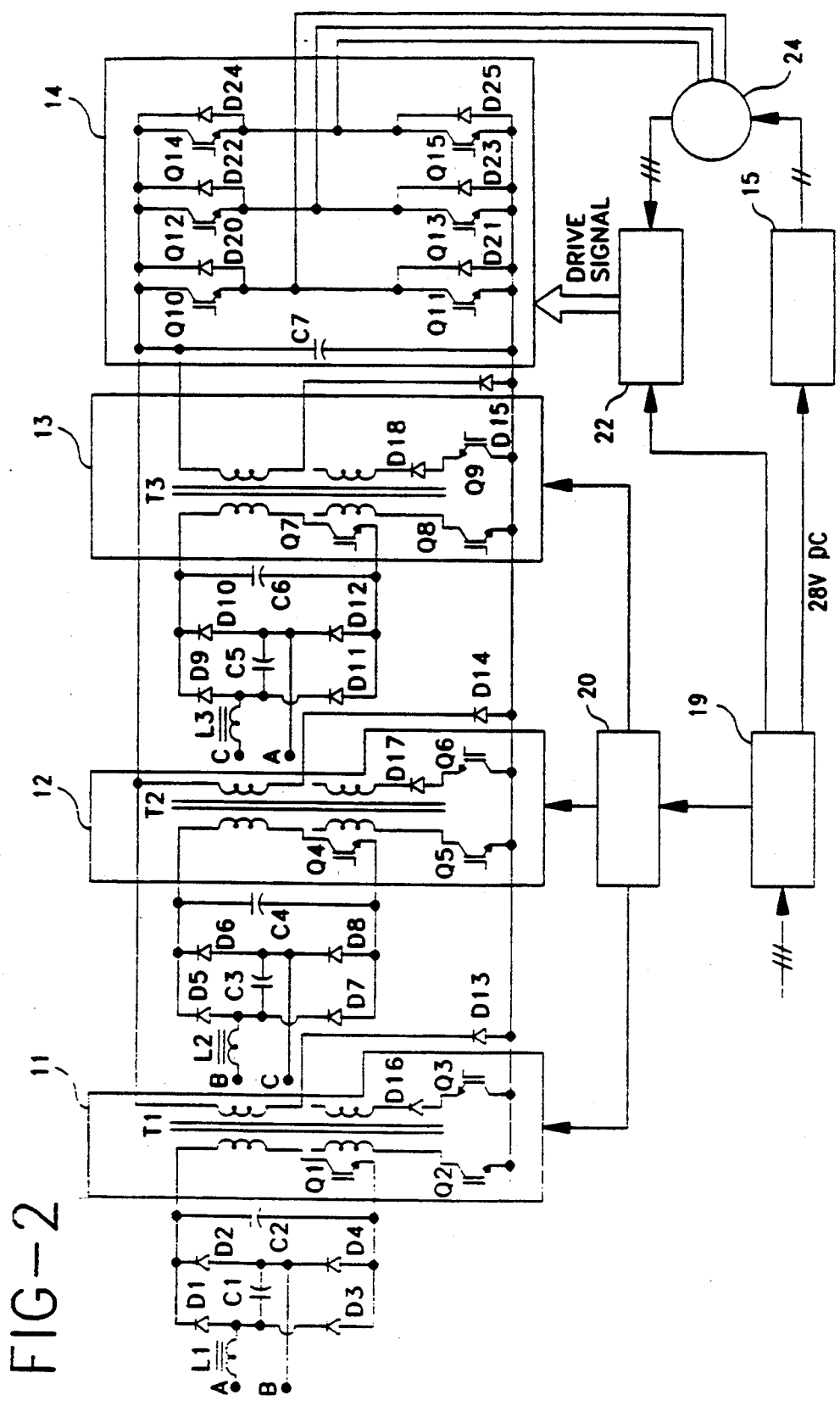
FIG. 2 is a schematic diagram illustrating a circuit equivalent to the preferred embodiment of the present invention during starting of an AC synchronous generator as a synchronous motor from a three phase AC input.

As stated earlier, the invention performs multi-functions and FIG. 2 illustrates the present invention utilized for starting an AC synchronous generator from a three-phase AC input.

Flyback converters 11, 12 and 13 derive their power from the three-phase AC input and are controlled by PWM controller 20 as described above. Flyback converter 11 comprises flyback inductor T1, transistor Q3, diode D16, transistor Q1 for the AC start and battery charging functions and transistor Q2 for the DC start function. Transistor Q3 and diode D16 are active enabling circuit for battery charging. Flyback converter 11 is connected between phase A and phase B through AC low pass filter L1-C1 and rectifier bridge consisting of diodes D1, D2, D3 and D4. Capacitor C2 is used to remove high frequency voltage spikes. AC filter L1-C1 is designed to attenuate the switching frequency harmonics injected into the input source.

Flyback converter 12 comprises flyback inductor T2, transistor Q6, diode D17, transistor Q4 for the AC start and battery charging functions and transistor Q5 for the DC start function. Transistor Q6 and diode D17 are active enabling circuit for battery charging. Flyback converter 12 is connected between phase B and phase C through AC filter L2-C3 and rectifier bridge consisting of diodes D5, D6, D7 and D8. Capacitor C4 is used to remove high frequency voltage spikes. AC filter L2-C3 is designed to attenuate the switching frequency harmonics injected into the input source.

Flyback converter 13 comprises flyback inductor T3, transistor Q9, diode D18, transistor Q7 for the AC start and battery charging functions and transistor Q8 for the DC start function. Transistor Q9 and diode D18 are active enabling circuit for battery charging. Flyback converter 13 is connected between phase C and phase A through AC filter L3-C5 and rectifier bridge consisting of diodes D9, D10, D11 and D12. Capacitor C6 is used to remove high frequency voltage spikes. AC filter L3-C5 is designed to attenuate the switching frequency harmonics injected into the input source.

In the AC start mode, transistors Q1, Q4 and Q7 are biased "ON" simultaneously at a 10 KHz rate for 50% duty cycle. The duty cycle is fixed at 50%. The transistors Q2, Q3, Q5, Q6, Q8 and Q9 are biased "OFF". As the duty cycle of Q1, Q4 and Q7 is maintained constant, output power delivered by the flyback converters is constant.

The output of the flyback converters are summed through diodes D13, D14 and D15 and fed to six step square wave inverter 14 which comprises DC bus capacitor C7, transistors Q10-Q15 and associated diodes D20-D25. DC bus capacitor C7 provides power when the flyback converters are biased OFF, and it also provides a path for reactive power circulation due to generator load.

Constant input power operation mode has been selected as the starter/generator develops sufficient torque to overcome drag torque and start the engine. The flyback converters are chosen such that they operate in discontinuous conduction mode at a maximum (50%) duty cycle.

Within the flyback converter, if L is the magnetizing inductance of the flyback inductors, Ipk is the peak current in the winding and f is the switching frequency, the output power $P_o$ is represented as follows.

$$P_o = \tfrac{1}{2} L Ipk^2 f$$

If the duty cycle of the flyback converters is maintained, the output power delivered by the flyback converters is constant and is represented as follows.

$$P_o = \frac{V_o^2}{R_L}$$

Where $V_o$ is equal to the output voltage from the flyback converters and Where $R_L$ is equal to the load resistance. In a constant power operation, output voltage of the flyback converters varies as a square root of the load resistance and is represented as follows.

$$V_o = [R_L P_o]^{\tfrac{1}{2}}$$

$$V_o = \left[ \frac{R_L L I_{pk}^2 f}{2} \right]^{\tfrac{1}{2}}$$

In other words, the flyback converters provide a high current at a low voltage and the converters output voltage increases as the load decreases.

The six step square wave inverter 14 operates from the output obtained from the flyback converters. The output from the inverter 14 is applied to the stator of AC starter/generator 24. The inverter is controlled by the timing logic 22. The inverter drive signals from the timing logic are locked to the rotor positions information obtained either directly from the resolver, 21 (FIG. 1) or indirectly from the back EMF sensor circuit, 23 (FIG. 1). This feature ensures that the synchronous machine never pulls out of synchronism. The control power supply 19 provides power to the timing logic 22, the field excitation controller 15 and the PWM controller 20.

When the AC synchronous starter/generator is stationary, sufficient DC excitation is provided to the main rotor field by injecting square wave AC voltage from field excitation controller 15 to the exciter field of starter/generator 24. By transformer action, voltages are induced in the exciter rotor windings. The induced voltages are rectified by the rotating diodes and the rectified DC voltage is applied to the main rotor field of the starter/generator 24.

At starting, a constant direct current is supplied to the stator of the AC starter/generator and single phase AC excitation to the exciter field. This produces torque and accelerates the rotor. As the rotor moves the rotor position information is updated and the inverter drive frequency varies. As the generator picks up speed, the DC current drawn from the flyback converters comes down and output voltage and drive frequency goes up.

Voltage/frequency ratio is maintained constant indirectly. The fifth and seventh harmonics present in the square wave voltage applied to the stator of the starter/generator gets rectified in the main rotor as the sixth harmonic component, and augments main rotor field excitation.

The flyback converters operate in discontinuous conduction mode and operate at around a maximum of 50% duty cycle. As a result, the input current follows the input voltage making the impedance of the entire circuit appear purely resistive.

With this type of engine start, minimum disturbance is introduced to the input source. In other words, input power quality such as high input power factor, low harmonic distortion is maintained.

Figure 3:
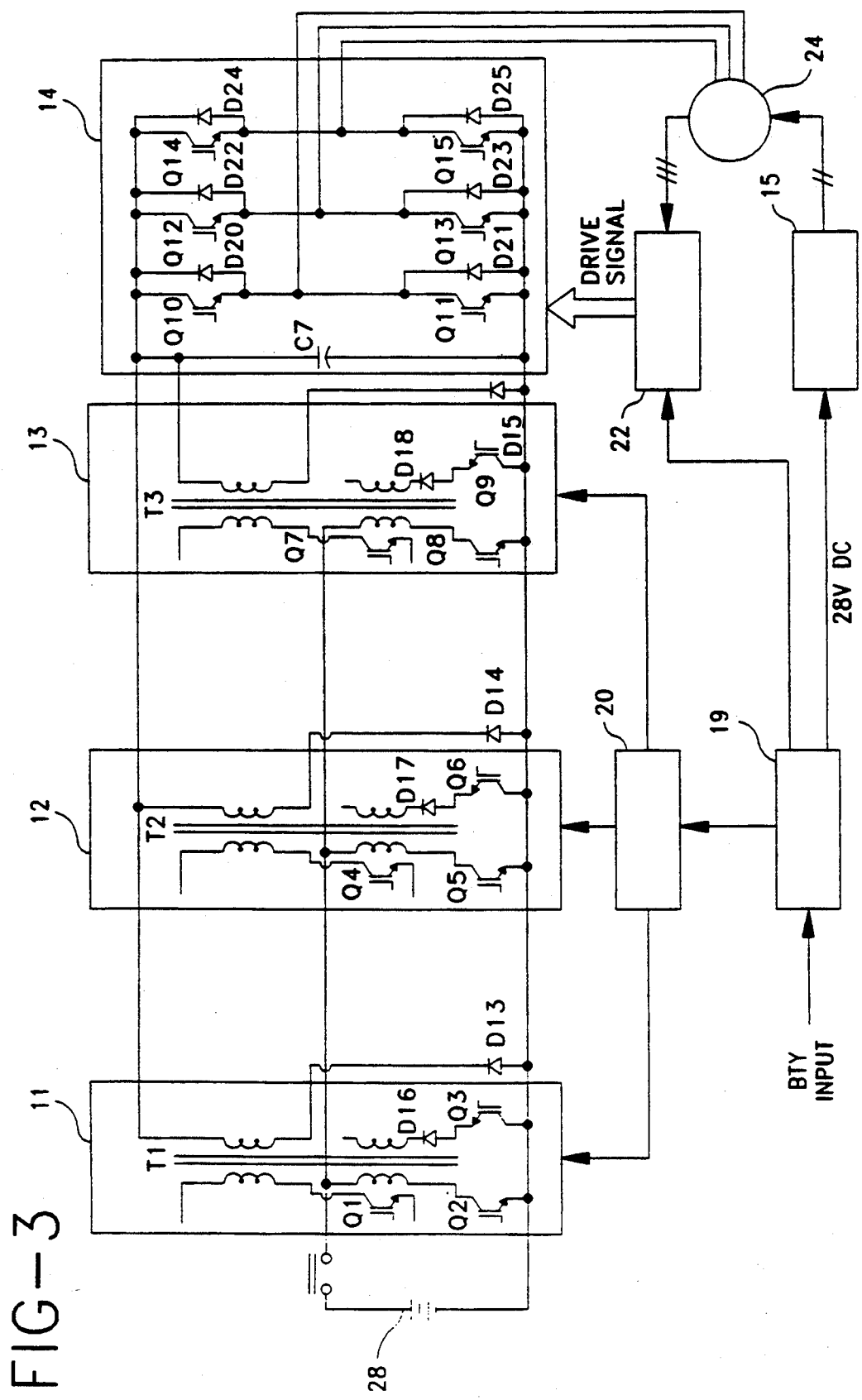
FIG. 3 is a schematic diagram illustrating a circuit equivalent to the preferred embodiment of the present invention during starting of an AC synchronous generator as a synchronous motor from a DC (battery) input.

FIG. 3 illustrates the present invention utilized for starting AC synchronous starter/generator 24 from a DC (battery) input.

The flyback converters 11, 12 and 13 derive their input from a battery 28 and are once again controlled by PWM controller 20. As stated above flyback converter 11 comprises flyback inductor T1, transistors Q1, Q2, Q3 and diode D16. Flyback converter 12 comprises flyback inductor T2, transistors Q4, Q5, Q6 and diode D17. Flyback converter 13 comprises flyback inductor T3, transistors Q7, Q8, Q9 and diode D18. In this DC start mode, the transistors Q2, Q5 and Q8 are biased "ON" simultaneously at 10 KHz rate for 50% duty cycle. The transistors Q1, Q3, Q4, Q6, Q7 and Q9 are biased "OFF". As the duty cycle of Q2, Q5 and Q8 are maintained constant. Output power delivered by the flyback converters is constant.

As stated earlier, in a constant power operation, output voltage of the flyback converters varies as a square root of the load resistance. In other words, the flyback converters provide high current at low voltage and the converters output voltage increases as the load decreases. This feature is most desirable to start the AC generator from a low voltage DC input. As a result, flyback converters have been used at the input to vary the voltage amplitude applied to the motor stator.

The six step square wave inverter 14 comprises DC bus capacitor C7, transistors Q10–Q15 and associated diodes D20–D25 and operates from the output obtained from the flyback converters. The inverter is controlled by the timing logic 22. The inverter drive signals are synchronized to the rotor position sensor circuit (not shown). The control power supply 19 provides power to the timing logic 22, the field excitation controller 15 and the PWM controller 20. Flyback converters, six step square wave inverter 14, field excitation controller 15 and associated controls are common to both AC start and DC start.

The DC start operation is similar to that of the AC start operation except that the input is derived from the battery. As the flyback converters operate in discontinuous conduction mode, less EMI is generated.

Figure 4:
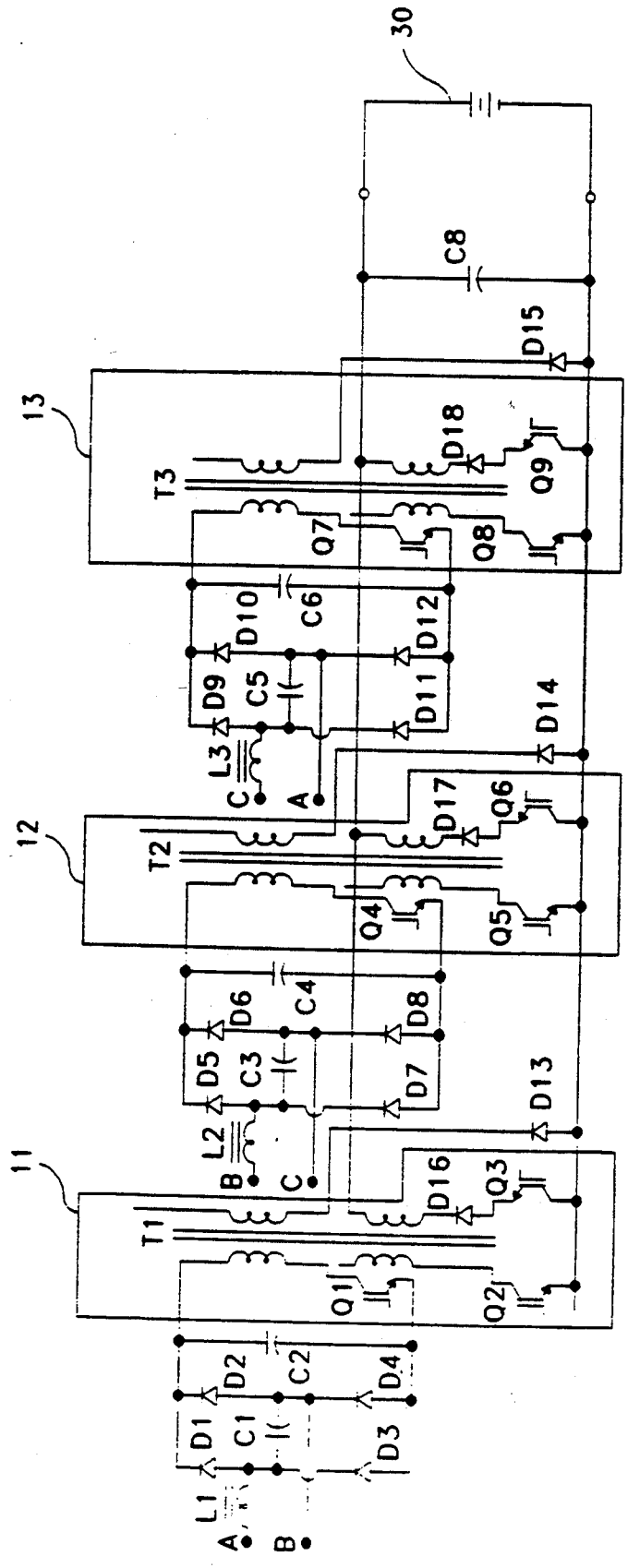
FIG. 4 is a schematic diagram illustrating a circuit equivalent to the preferred embodiment of the present invention during the charging of a battery from a three-phase AC input.

FIG. 4 illustrates the present invention utilized for charging a battery from a three-phase AC input. The flyback converters 11, 12, 13 and input bridge rectifiers 16, 17 and 18, as shown in FIG. 1, are common to AC start operation and the battery charging function. The flyback converters derive their power from the three phase AC input.

As stated above flyback converter 11 comprises flyback inductor T1, transistors Q1, Q2, Q3 and diode D16. Flyback converter 11 is connected between phase A and phase B through a low pass filter L1-C1 and rectifier bridge consisting of diodes D1, D2, D3 and D4. Capacitor C2 is used to remove high frequency voltage spikes. The AC filter L1-C1 is designed to attenuate the switching frequency harmonics injected into the input source.

Flyback converter 12 comprises flyback inductor T2, transistors Q4, Q5, Q6 and diode D17. Flyback converter 12 is connected between phase B and phase C through an AC filter L2-C3 and rectifier bridge consisting of diodes D5, D6, D7 and D8. Capacitor C4 is used to remove high frequency voltage spikes. The AC filter L2-C3 is designed to attenuate the switching frequency harmonics injected into the input source.

Flyback converter 13 comprises flyback inductor T3, transistors Q7, Q8, Q9 and diode D18. Flyback converter 13 is connected between phase C and phase A through an AC filter L3-C5 and rectifier bridge consisting of diodes D9, D10, D11 and D12. Capacitor C6 is used to remove high frequency voltage spikes. The AC filter L3-C5 is designed to attenuate the switching frequency harmonics injected into the input source.

The output of the flyback converters are summed through diodes D13, D14 and D15. Transistors Q3, Q6 and Q9 are turned "ON" throughout this mode of operation, battery charging or providing regulated DC output. Transistors Q2, Q5, Q8 are biased "OFF". Transistors Q1, Q4 and Q7 are turned "ON" simultaneously and turned "OFF" simultaneously. By controlling the duty cycle of the transistors Q1, Q4 and Q7, charging rate of the battery 30 can be controlled. Filter capacitor C8 attenuates the voltage ripple at that terminal.

If it is required that the regulated DC output voltage be compatible to the battery rating, the battery can be disconnected and a DC load can be connected in place of the battery.

It is not intended that this invention be limited to the hardware arrangement, or operational procedures shown disclosed. This invention includes all of the alterations and variations thereto as encompassed within the scope of the claims as follows.

We claim:

1. A low input harmonic induced multiple use AC synchronous generator starter converter comprising:
    flyback converter means for receiving input power of either AC or DC;
    output power means connected to said flyback converter means for providing converted output power of either AC or DC without degradation of said input power; wherein said output power means comprises:
    square wave inverter means connected between said flyback converter means and said synchronous generator;
    field excitation controller means for providing single phase excitation to exciter stator of said synchronous generator;
    timing logic means for controlling said square wave inverter means;
    PWM controller means for controlling said flyback converter means; and,
    control power supply means for receiving said input power of either AC or DC and for providing control power to said field excitation controller means, said timing logic means and said PWM controller means.

2. A low input harmonic induced multiple use AC synchronous generator starter converter as claimed in claim 1 wherein said square wave inverter means comprises:
    bus capacitor means connected across said flyback converter means; and,
    transistor/diode means connected across said bus capacitor means.

3. A low input harmonic induced multiple use AC synchronous generator starter converter as claimed in claim 2 wherein said transistor/diode means comprises:
    three pairs of transistors.

4. A low input harmonic induced multiple use AC synchronous generator starter converter as claimed in claim 1 wherein said square wave inverter means comprises:
    a plurality of steps.

5. A low input harmonic induced multiple use AC synchronous generator starter converter as claimed in claim 1 wherein said timing logic comprises:
    EMF sensing means for monitoring output of said square wave inverter means; and,
    resolver means for providing a rotor position signal.

6. A low input harmonic induced multiple use AC synchronous generator starter converter as claimed in claim 5 wherein:
    drive signals of said square wave inverter means are locked to said rotor position signal.

7. A low input harmonic induced multiple use AC synchronous generator starter converter as claimed in claim 1 wherein:
    output of said square wave inverter means is a variable voltage, variable frequency, square wave AC output.

8. A low input harmonic induced multiple use AC synchronous generator starter converter comprising:
    flyback converter means for receiving input power of either AC or DC; and,
    output power means connected to said flyback converter means for providing converted output power of either AC or DC without degradation of said input power; wherein:

magnetic components as well as several semiconductor rectifiers perform multi-functions.

9. A low input harmonic induced multiple use AC synchronous generator starter converter as claimed in claim 8 wherein:

said converted output power is capable of starting AC generators as a motor, charging batteries or providing regulated DC outputs.

10. A low input harmonic induced multiple use AC synchronous generator starter converter as claimed in claim 8 wherein said flyback converter means comprises:

a plurality of flyback converters;

rectifier bridge means connected between said input power and each of said plurality of flyback converters; and, summing diode means, connected between each of said plurality of flyback converters and said output power means.

11. A low input harmonic induced multiple use AC synchronous generator starter converter as claimed in claim 8 wherein said input power comprises:

three phase alternating current.

12. A low input harmonic induced multiple use AC synchronous generator starter converter as claimed in claim 8 wherein said input power comprises:

direct current.

13. A low input harmonic induced multiple use AC synchronous generator starter converter as claimed in claim 8 wherein:

said flyback converter means provides input/output isolation.

14. A low input harmonic induced multiple use AC synchronous generator starter converter as claimed in claim 8 wherein:

said flyback converter means operates in discontinuous conduction mode at a maximum (50%) duty cycle during AC start or DC start.

15. A low input harmonic induced multiple use AC synchronous generator starter converter as claimed in claim 8 wherein:

output voltage of said flyback converter means increases as load decreases.

16. A low input harmonic induced multiple use AC synchronous generator starter converter as claimed in claim 8 wherein said flyback converter means comprises:

three flyback converters;

rectifier bridge means connected between said input power and each of said three flyback converters; and, summing diode means, connected between each of said three flyback converters and said output power means.

17. A low input harmonic induced multiple use AC synchronous generator starter converter as claimed in claim 16 wherein each of said three flyback converters comprises:

transistor means connected to said rectifier bridge means; and, transformer means connected between said transistor means and said summing diode means.

18. A low input harmonic induced multiple use AC synchronous generator starter converter as claimed in claim 16 wherein said rectifier bridge means comprises:

low pass filter means for receiving and filtering said input power;

rectifier means connected to said low pass filter means;

capacitor means connected across said rectifier means for removing high frequency voltage spikes.

* * * * *